(12) United States Patent
Kim (10) Patent No.: US 10,885,388 B1
(45) Date of Patent: Jan. 5, 2021

(54) METHOD FOR GENERATING TRAINING DATA TO BE USED FOR TRAINING DEEP LEARNING NETWORK CAPABLE OF ANALYZING IMAGES AND AUTO LABELING DEVICE USING THE SAME

(71) Applicant: Superb AI Co., Ltd., Seoul (KR)

(72) Inventor: Kye-Hyeon Kim, Seoul (KR)

(73) Assignee: Superb AI Co., Ltd., Seoul (KR)

( * ) Notice: Subject to any disclaimer, the term of this patent is extended or adjusted under 35 U.S.C. 154(b) by 0 days.

(21) Appl. No.: 16/984,993

(22) Filed: Aug. 4, 2020

(51) Int. Cl.
  *G06K 9/62* (2006.01)
  *G06N 20/00* (2019.01)

(52) U.S. Cl.
  CPC ......... *G06K 9/6256* (2013.01); *G06K 9/6228* (2013.01); *G06K 9/6262* (2013.01); *G06K 9/6267* (2013.01); *G06N 20/00* (2019.01)

(58) Field of Classification Search
  CPC .. G06K 9/6256; G06K 9/6228; G06K 9/6262; G06K 9/6267; G06N 20/00
  See application file for complete search history.

(56) References Cited

U.S. PATENT DOCUMENTS

| | | | | |
|---|---|---|---|---|
| 9,965,704 B2* | 5/2018 | Zhou | | G06K 9/6223 |
| 2006/0222239 A1* | 10/2006 | Bargeron | | G06K 9/6256 |
| | | | | 382/159 |
| 2018/0181881 A1* | 6/2018 | Du | | G06K 9/6256 |
| 2019/0033447 A1* | 1/2019 | Chan | | G01S 15/89 |
| 2019/0065901 A1* | 2/2019 | Amato | | G06N 3/04 |
| 2019/0304102 A1* | 10/2019 | Chen | | G06K 9/6271 |
| 2019/0391578 A1* | 12/2019 | Tariq | | G05D 1/0231 |
| 2020/0012894 A1* | 1/2020 | Lee | | G06K 9/00624 |
| 2020/0036528 A1* | 1/2020 | Ortiz | | G06N 3/08 |
| 2020/0117901 A1* | 4/2020 | McClernon | | G06N 3/04 |
| 2020/0193222 A1* | 6/2020 | Singh | | G06N 3/08 |
| 2020/0226421 A1* | 7/2020 | Almazan | | G06N 3/084 |
| 2020/0293064 A1* | 9/2020 | Wu | | G06K 9/6256 |
| 2020/0302781 A1* | 9/2020 | Moura | | G08G 1/0116 |

* cited by examiner

*Primary Examiner* — Utpal D Shah (74) *Attorney, Agent, or Firm* — Greenberg Traurig, LLP (57) ABSTRACT

A method for generating training data for a deep learning network is provided. The method includes steps of: an auto labeling device (a) (i) allowing a labeling network to label acquired test images and generate primary bounding boxes, primary class information, and primary confidence scores, (ii) allowing a labeler to verify labeled primary objects and generate correction-related class information, and (iii) setting first and second threshold confidence scores; (b) (i) allowing the labeling network to label acquired unlabeled images and generate secondary bounding boxes, secondary class information, and secondary confidence scores, (ii) allowing an object difficulty estimation module to generate object difficulty scores and determine object difficulty classes, and (iii) allowing an image difficulty estimation module to determine image difficulty classes; and (c) allowing the labeler to verify the first labeled images and generating the training data comprised of second labeled images and the verified first labeled images.

14 Claims, 5 Drawing Sheets

METHOD FOR GENERATING TRAINING DATA TO BE USED FOR TRAINING DEEP LEARNING NETWORK CAPABLE OF ANALYZING IMAGES AND AUTO LABELING DEVICE USING THE SAME

FIELD OF THE DISCLOSURE

The present disclosure relates to a method for generating training data to be used for training a deep learning network capable of analyzing images and an auto labeling device using the same; and more particularly, to the method for generating the training data to be used for training the deep learning network capable of analyzing the images and determining whether labeled data are required to be verified by a labeler and the auto labeling device using the same.

BACKGROUND OF THE DISCLOSURE

Recently, methods of performing object identification and the like making use of machine learning are being studied. As part of a family of machine learning methods, deep learning, which uses a neural network with several hidden layers between an input layer and an output layer, shows high performance in recognition.

And, the neural network using the deep learning generally is trained through backpropagation using losses.

In order to perform such training of the deep learning network, training data are needed in which labels are added to individual data by labelers. Preparing these training data (i.e. classifying the data correctly) can be very labour-intensive, expensive and inconvenient, especially if a large amount of the training data is to be used and if the quality of the data pre-preparation is not consistently high. Conventional interactive labeling can be computationally expensive and fail to deliver good results.

Therefore, recently, auto labeling which adds labels to training images using a deep learning-based automatic labeling device is popular, and inspectors may inspect the auto-labeled training images to correct the labels.

However, in such a conventional method, throughputs of the inspectors are low as compared to the throughput of the automatic labeling device. Therefore, it takes a long time to generate true labels for entire training images. In order to improve the overall throughput, the number of the inspectors must be increased, but it results in an increase of the cost.

Also, it is difficult to acquire a large number of the inspectors skilled enough to keep up with the throughput of the automatic labeling device.

SUMMARY OF THE DISCLOSURE

It is an object of the present disclosure to solve all the aforementioned problems.

It is another object of the present disclosure to improve a throughput of auto labeling for entire training images.

It is still another object of the present disclosure to maintain a maximal throughput of the auto labeling, while reducing the number of inspectors.

It is still yet another object of the present disclosure to allow unskilled inspectors to perform label-inspecting keeping up with a throughput of the auto labeling device.

It is still yet another object of the present disclosure to improve a throughput of the auto labeling, without degrading an accuracy of the auto labeling.

In accordance with one aspect of the present disclosure, there is provided a method for generating training data to be used for training a deep learning network capable of analyzing images, including steps of: (a) if one or more test images are acquired, an auto labeling device performing or supporting another device to perform (i) a process of allowing the labeling network to (i-1) label each of the test images and thus to generate each of labeled test images, and (i-2) generate each of primary bounding boxes, each piece of primary class information, and each of primary confidence scores, corresponding to each of one or more primary objects, wherein the primary objects are present in each of the labeled test images and wherein each of the primary confidence scores is a value ranging from 0 to 1 representing a probability that each of the primary objects is present in its corresponding each of the primary bounding boxes, (ii) a process of allowing at least one labeler to verify labeled primary objects on each of the labeled test images, to thereby generate correction-related class information, wherein the correction-related class information includes information on a first verification class representing a class of a first primary label, among primary labels of the labeled primary objects, required to be corrected or having been corrected and a second verification class representing a class of a second primary label, among the primary labels of the labeled primary objects, not required to be corrected or not having been corrected and wherein each of the primary labels includes information on its corresponding each of the primary bounding boxes and its corresponding each piece of the primary class information and, (iii) a process of setting a first threshold confidence score to be used for determining whether it becomes unnecessary for the labeler to verify the labeled primary objects by referring to the primary confidence scores and the correction-related class information, respectively corresponding to the labeled primary objects and (iv) a process of setting a second threshold confidence score as a preset maximal allowed error, wherein the preset maximal allowed error is less than the first threshold confidence score; (b) if one or more unlabeled images are acquired, the auto labeling device performing or supporting another device to perform (i) a process of allowing the labeling network to (i-1) label each of the unlabeled images and thus to generate labeled images, and (i-2) generate each of secondary bounding boxes, each piece of secondary class information, and each of secondary confidence scores, corresponding to each of one or more secondary objects, wherein the secondary objects are present in each of the labeled images, and wherein each of the secondary confidence scores is a value ranging from 0 to 1 representing a probability that each of the secondary objects is present in its corresponding each of the secondary bounding boxes, (ii) a process of allowing an object difficulty estimation module to (ii-1) generate each of object difficulty scores on each of labeled secondary objects by using (1) each of the secondary confidence scores corresponding to each of the labeled secondary objects and (2) the first threshold confidence score, wherein each of the object difficulty scores is a value ranging from 0 to 1 representing a probability of necessity for verifying each of the labeled secondary objects, and (ii-2) determine each of object difficulty classes on each of the labeled secondary objects by using (1) each of the secondary confidence scores corresponding to each of the labeled secondary objects and (2) the second threshold confidence score, wherein the object difficulty classes include a hard object class representing a class of a first labeled secondary object, among the labeled secondary objects, required to be verified by the labeler and an easy object class representing a class of a second labeled secondary object, among the labeled secondary objects, not required to be verified by the labeler, (iii) a process of allowing an image difficulty estimation module to (iii-1) generate each of image difficulty scores on each of the labeled images by referring to each of the object difficulty scores on each of the labeled secondary objects, wherein each of the image difficulty scores is a value ranging from 0 to 1 representing a probability of necessity for verifying each of the labeled images, and (iii-2) determine each of image difficulty classes on each of the labeled images by referring to the image difficulty scores, wherein the image difficulty classes include a hard image class representing a class of a first labeled image, among the labeled images, required to be verified by the labeler and an easy image class representing a class of a second labeled image, among the labeled images, not required to be verified by the labeler; and (c) the auto labeling device performing or supporting another device to perform (i) a process of transmitting, to the labeler, first labeled images which are labeled as the hard image class by referring to each of the image difficulty classes on each of the labeled images, to thereby allow the labeler to verify the first labeled images and thus to generate verified labeled images, and (ii) a process of generating the training data comprised of (1) second labeled images which are labeled as the easy image class among the labeled images, and (2) the verified labeled images.

As one example, at the step of (a), the auto labeling device performs or supports another device to perform (i) a process of confirming a first distribution over the primary confidence scores of the labeled primary objects corresponding to the first verification class and a second distribution over the primary confidence scores of the labeled primary objects corresponding to the second verification class, (ii) according to respective orders of a highest one to a lowest one of the primary confidence scores in the first distribution and those in the second distribution, (ii-1) a process of calculating a first cumulative summation of the number of the labeled primary objects corresponding to the first verification class and a process of calculating a second cumulative summation of the number of the labeled primary objects corresponding to the second verification class, and (ii-2) a process of setting the first threshold confidence score to be a minimum among the primary confidence scores such that a ratio of (1) the second cumulative summation to (2) a sum of the first cumulative summation and the second cumulative summation satisfies a preset first criterion value, and (iii) according to an order of the highest one to the lowest one of the primary confidence scores in the first distribution. (iii-1) a process of calculating the first cumulative summation of the number of the labeled primary objects corresponding to the first verification class, and (iii-2) a process of setting the second threshold confidence score such that a ratio of (1) the first cumulative summation to (2) the sum of the first cumulative summation and the second cumulative summation corresponds to the maximal allowed error.

As one example, at the step of (b), the auto labeling device performs or supports another device to perform a process of allowing the object difficulty estimation module to (i) (i-1) compare (1) each of the secondary confidence scores on each of the labeled secondary objects and (2) the first threshold confidence score, and (i-2) generate (1) the object difficulty scores of the labeled secondary objects, whose secondary confidence scores are equal to or greater than the first threshold confidence score, as 0 and (2) the object difficulty scores of the labeled secondary objects, whose secondary confidence scores are less than the first threshold confidence score, respectively as 1 minus their corresponding secondary confidence scores, and (ii) (ii-1) compare (1) each of the secondary confidence scores on each of the labeled secondary objects and (2) the second threshold confidence score, and (ii-2) determine (1) the object difficulty classes of the labeled secondary objects, whose secondary confidence scores are equal to or greater than the second threshold confidence score, as the easy object class and (2) the object difficulty classes of the labeled secondary objects, whose secondary confidence scores are less than the second threshold confidence score, as the hard object class.

As one example, at the step of (b), the auto labeling device performs or supports another device to perform a process of allowing the image difficulty estimation module to (i) cumulatively sum the object difficulty scores of the labeled secondary objects corresponding to each of the labeled images and (ii) generate each of the image difficulty scores on each of the labeled images.

As one example, the auto labeling device performs or supports another device to perform a process of allowing the image difficulty estimation module to (i) compare (1) each of the image difficulty scores on each of the labeled images and (2) 1 minus the second threshold confidence score, and (ii) determine (1) the image difficulty classes of the labeled images, whose image confidence scores are equal to or greater than said 1 minus the second threshold confidence score, as the hard image class, and (2) the image difficulty classes of the labeled images, whose image confidence scores are less than said 1 minus the second threshold confidence score, as the easy image class.

As one example, the method further comprises a step of: (d) the auto labeling device performing or supporting another device to perform a process of training the labeling network by using the verified labeled images.

As one example, the auto labeling device performs or supports another device to perform a process of updating one or more parameters of the labeling network via back-propagation using one or more losses calculated by referring to the first labeled images and the verified labeled images.

In accordance with another aspect of the present disclosure, there is provided an auto labeling device for generating training data to be used for training a deep learning network capable of analyzing images, including: at least one memory that stores instructions; and at least one processor configured to execute the instructions to perform or support another device to perform: (1) if one or more test images are acquired, (i) a process of allowing the labeling network to (i-1) label each of the test images and thus to generate each of labeled test images, and (i-2) generate each of primary bounding boxes, each piece of primary class information, and each of primary confidence scores, corresponding to each of one or more primary objects, wherein the primary objects are present in each of the labeled test images and wherein each of the primary confidence scores is a value ranging from 0 to 1 representing a probability that each of the primary objects is present in its corresponding each of the primary bounding boxes, (ii) a process of allowing at least one labeler to verify labeled primary objects on each of the labeled test images, to thereby generate correction-related class information, wherein the correction-related class information includes information on a first verification class representing a class of a first primary label, among primary labels of the labeled primary objects, required to be corrected or having been corrected and a second verification class representing a class of a second primary label, among the primary labels of the labeled primary objects, not required to be corrected or not having been corrected and wherein each of the primary labels includes information on its corresponding each of the primary bounding boxes and its corresponding each piece of the primary class information and, (iii) a process of setting a first threshold confidence score to be used for determining whether it becomes unnecessary for the labeler to verify the labeled primary objects by referring to the primary confidence scores and the correction-related class information, respectively corresponding to the labeled primary objects and (iv) a process of setting a second threshold confidence score as a preset maximal allowed error, wherein the preset maximal allowed error is less than the first threshold confidence score, (II) if one or more unlabeled images are acquired, (i) a process of allowing the labeling network to (i-1) label each of the unlabeled images and thus to generate labeled images, and (i-2) generate each of secondary bounding boxes, each piece of secondary class information, and each of secondary confidence scores, corresponding to each of one or more secondary objects, wherein the secondary objects are present in each of the labeled images, and wherein each of the secondary confidence scores is a value ranging from 0 to 1 representing a probability that each of the secondary objects is present in its corresponding each of the secondary bounding boxes, (ii) a process of allowing an object difficulty estimation module to (ii-1) generate each of object difficulty scores on each of labeled secondary objects by using (1) each of the secondary confidence scores corresponding to each of the labeled secondary objects and (2) the first threshold confidence score, wherein each of the object difficulty scores is a value ranging from 0 to 1 representing a probability of necessity for verifying each of the labeled secondary objects, and (ii-2) determine each of object difficulty classes on each of the labeled secondary objects by using (1) each of the secondary confidence scores corresponding to each of the labeled secondary objects and (2) the second threshold confidence score, wherein the object difficulty classes include a hard object class representing a class of a first labeled secondary object, among the labeled secondary objects, required to be verified by the labeler and an easy object class representing a class of a second labeled secondary object, among the labeled secondary objects, not required to be verified by the labeler, (iii) a process of allowing an image difficulty estimation module to (iii-1) generate each of image difficulty scores on each of the labeled images by referring to each of the object difficulty scores on each of the labeled secondary objects, wherein each of the image difficulty scores is a value ranging from 0 to 1 representing a probability of necessity for verifying each of the labeled images, and (iii-2) determine each of image difficulty classes on each of the labeled images by referring to the image difficulty scores, wherein the image difficulty classes include a hard image class representing a class of a first labeled image, among the labeled images, required to be verified by the labeler and an easy image class representing a class of a second labeled image, among the labeled images, not required to be verified by the labeler, and (III) (i) a process of transmitting, to the labeler, first labeled images which are labeled as the hard image class by referring to each of the image difficulty classes on each of the labeled images, to thereby allow the labeler to verify the first labeled images and thus to generate verified labeled images, and (ii) a process of generating the training data comprised of (1) second labeled images which are labeled as the easy image class among the labeled images, and (2) the verified labeled images.

As one example, at the process of (1), the processor performs or supports another device to perform (i) a process of confirming a first distribution over the primary confidence scores of the labeled primary objects corresponding to the first verification class and a second distribution over the primary confidence scores of the labeled primary objects corresponding to the second verification class, (ii) according to respective orders of a highest one to a lowest one of the primary confidence scores in the first distribution and those in the second distribution, (ii-1) a process of calculating a first cumulative summation of the number of the labeled primary objects corresponding to the first verification class and a process of calculating a second cumulative summation of the number of the labeled primary objects corresponding to the second verification class, and (ii-2) a process of setting the first threshold confidence score to be a minimum among the primary confidence scores such that a ratio of (1) the second cumulative summation to (2) a sum of the first cumulative summation and the second cumulative summation satisfies a preset first criterion value, and (iii) according to an order of the highest one to the lowest one of the primary confidence scores in the first distribution, (iii-1) a process of calculating the first cumulative summation of the number of the labeled primary objects corresponding to the first verification class, and (iii-2) a process of setting the second threshold confidence score such that a ratio of (1) the first cumulative summation to (2) the sum of the first cumulative summation and the second cumulative summation corresponds to the maximal allowed error.

As one example, at the process of (II), the processor performs or supports another device to perform a process of allowing the object difficulty estimation module to (i)(i-1) compare (1) each of the secondary confidence scores on each of the labeled secondary objects and (2) the first threshold confidence score, and (i-2) generate (1) the object difficulty scores of the labeled secondary objects, whose secondary confidence scores are equal to or greater than the first threshold confidence score, as 0 and (2) the object difficulty scores of the labeled secondary objects, whose secondary confidence scores are less than the first threshold confidence score, respectively as 1 minus their corresponding secondary confidence scores, and (ii) (ii-1) compare (1) each of the secondary confidence scores on each of the labeled secondary objects and (2) the second threshold confidence score, and (ii-2) determine (1) the object difficulty classes of the labeled secondary objects, whose secondary confidence scores are equal to or greater than the second threshold confidence score, as the easy object class and (2) the object difficulty classes of the labeled secondary objects, whose secondary confidence scores are less than the second threshold confidence score, as the hard object class.

As one example, at the process of (II), the processor performs or supports another device to perform a process of allowing the image difficulty estimation module to (i) cumulatively sum the object difficulty scores of the labeled secondary objects corresponding to each of the labeled images and (ii) generate each of the image difficulty scores on each of the labeled images.

As one example, the processor performs or supports another device to perform a process of allowing the image difficulty estimation module to (i) compare (1) each of the image difficulty scores on each of the labeled images and (2) 1 minus the second threshold confidence score, and (ii) determine (1) the image difficulty classes of the labeled images, whose image confidence scores are equal to or greater than said 1 minus the second threshold confidence score, as the hard image class, and (2) the image difficulty classes of the labeled images, whose image confidence scores are less than said 1 minus the second threshold confidence score, as the easy image class.

As one example, the processor further performs or supports another device to perform: (IV) a process of training the labeling network by using the verified labeled images.

As one example, the processor performs or supports another device to perform a process of updating one or more parameters of the labeling network via backpropagation using one or more losses calculated by referring to the first labeled images and the verified labeled images.

In order to accomplish objects above and characteristic effects to be described later of the present disclosure, distinctive structures of the present disclosure are described as follows.

In addition, recordable media that are readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout several aspects.

Any images referred to in the present disclosure may include images related to any roads paved or unpaved, in which case the objects on the roads or near the roads may include vehicles, persons animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

For reference, throughout the present disclosure, the phrase "for training" or "training" is added to terms related to training processes, and the phrase "for testing", "testing", or "test" is added to terms related to testing processes, to avoid possible confusion.

To allow those skilled in the art to carry out the present disclosure easily, the example embodiments of the present disclosure will be explained by referring to attached diagrams in detail as shown below.

Figure 1:
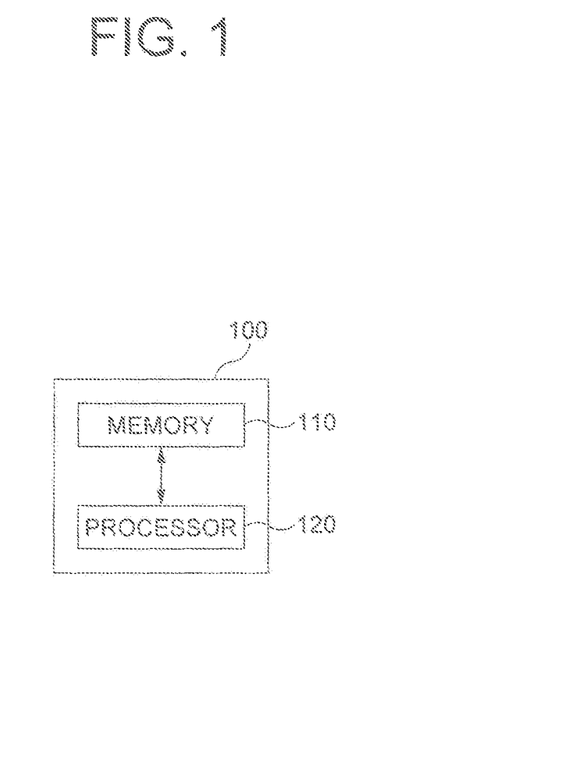
FIG. 1 is a drawing schematically illustrating an auto labeling device for generating training data to be used for training a deep learning network capable of analyzing images in accordance with one example of the present disclosure.

FIG. 1 is a drawing schematically illustrating an auto labeling device for generating training data to be used for training a deep learning network capable of analyzing images in accordance with one example of the present disclosure. By referring to FIG. 1, the auto labeling device 100 may include a memory 110 for storing instructions to (i) label unlabeled images to generate labeled images and determine whether the labeled images are required to be verified, (ii) allow a labeler to verify only the labeled images which are determined as required to be verified, and (iii) generate the training data, to be used for training the deep learning network, comprised of verified labeled images and the labeled images determined as not required to be verified, and a processor 120 for performing processes of (i) labeling the unlabeled images to generate the labeled images and determine whether the labeled images are required to be verified, (ii) allowing the labeler to verify only the labeled images which are determined as required to be verified, and (iii) generating the training data comprised of the verified labeled images and the labeled images which are determined as not required to be verified, according to the instructions in the memory 110. Herein, the labeler may be a human, but the scope of the present disclosure is not limited thereto.

Specifically, the auto labeling device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS (operating system) and software configuration of applications that achieve specific purposes.

Such description of the computing device does not exclude an integrated device including any combination of a processor, a memory, a medium, or any other computing components for implementing the present disclosure.

As used in this specification, the abstract, and the appended claims, a word "primary" is added in front of terms related to processes using test images, i.e., images that are labeled or unlabeled, and a word "secondary" is added in front of terms related to processes using images that are unlabeled. For example, one or more primary objects may be present in each of the test images, and further, each of primary bounding boxes, each piece of primary class information, and each of primary confidence scores may correspond to each of the primary objects. Also, the primary bounding boxes and the primary class information may be primary labels of the primary objects.

Figure 2:
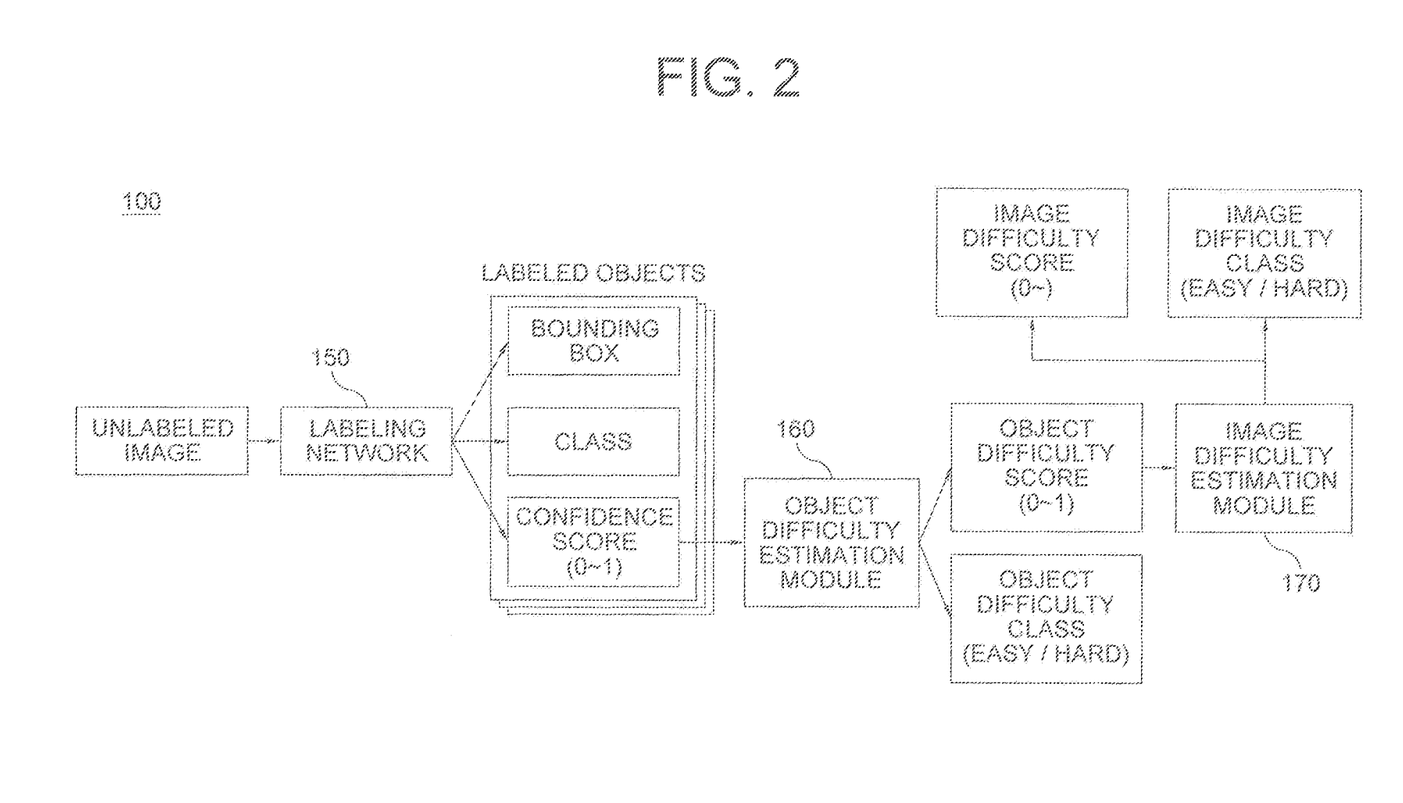
FIG. 2 is a block diagram schematically illustrating the auto labeling device for generating the training data in accordance with one example of the present disclosure.

Also, by referring to FIG. 2, the auto labeling device 100 may perform or support another device to perform a process of labeling the unlabeled images to generate the labeled images, a process of generating bounding boxes and class information, corresponding to one or more labeled objects on the labeled images, as labels corresponding to the labeled objects, and a process of generating confidence scores of the labeled objects. Herein, a labeling network 150 may be an AI (Artificial Intelligence) based on deep learning which labels images, for example, may be a trained object detector based on the deep learning, but the scope of the present disclosure is not limited thereto, and may be any deep learning network capable of labeling images. And, each of the confidence scores may be a value ranging from 0 to 1 representing a probability that each of one or more objects is present in its corresponding each of the bounding boxes.

And, the auto labeling device 100 may allow an object difficulty estimation module 160 to generate each of object difficulty scores on each of one or more labeled secondary objects, and determine each of object difficulty classes on each of the labeled secondary objects. Herein, the labeled secondary objects may be present in each of the labeled images.

Also, the auto labeling device 100 may allow an image difficulty estimation module 170 to (i) generate each of image difficulty scores on each of the labeled images by referring to each of the object difficulty scores on each of the labeled secondary objects, and (ii) determine each of image difficulty classes on each of the labeled images by referring to each of the image difficulty scores.

Thereafter, the auto labeling device 100 may acquire the verified labeled images, among the labeled images, which are verified by at least one labeler whose image difficulty classes are determined as a hard image class, and may generate the training data comprised of (1) the verified labeled images and (2) the labeled images whose image difficulty classes are determined as an easy image class.

Figure 3:
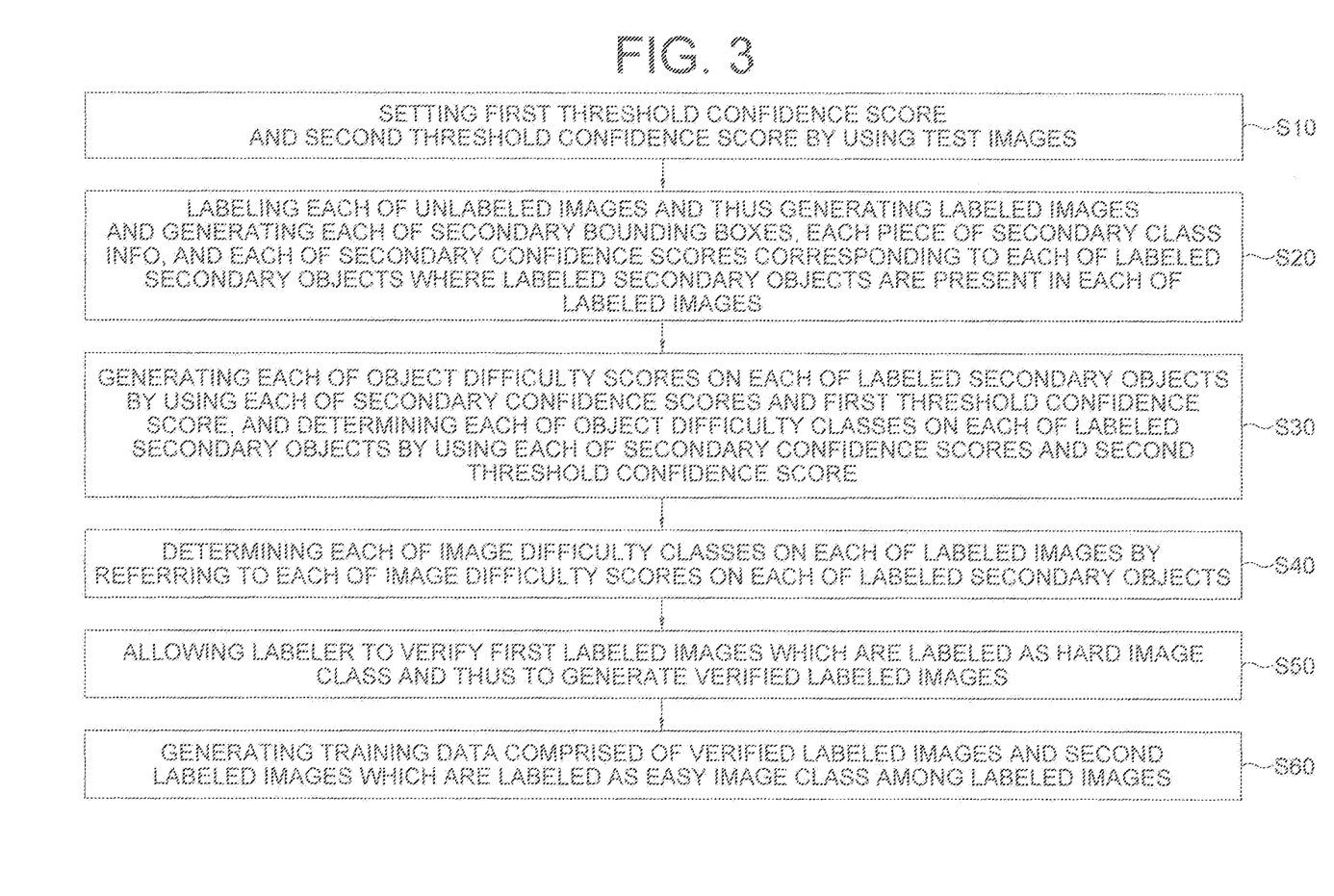
FIG. 3 is a drawing schematically illustrating a process of generating the training data in accordance with one example of the present disclosure.

A method for generating the training data to be used for training the deep learning network capable of analyzing the images by using the auto labeling device 100 in accordance with one example of the present disclosure is described by referring to FIG. 3.

First, the auto labeling device 100 may perform or support another device to perform a process of setting a first threshold confidence score and a second threshold confidence score by using the test images to be explained below at a step of S10.

Processes of setting the first threshold confidence score and the second threshold confidence score using the test images are described in detail as follows.

If the test images are acquired, the auto labeling device 100 may perform or support another device to perform a process of allowing the labeling network 150 to label each of the test images and thus to generate each of labeled test images.

Herein, the test images may be comprised of the labeled images and the unlabeled images. And, a test data set created by using the test images may be comprised of (1) the labeled images, or (2) the unlabeled images, or (3) the labeled images and the unlabeled images.

Also, through labeling the test images, the labeling network 150 may perform or support another device to perform a process of generating each of primary bounding boxes, each piece of primary class information, and each of primary confidence scores, corresponding to each of one or more primary objects, where the primary objects are present in each of the labeled test images. Herein, the primary bounding boxes and the primary class information may be primary labels of the primary objects, and each of the primary confidence scores may be a value ranging from 0 to 1 representing a probability that each of the primary objects is present in its corresponding each of the primary bounding boxes. That is, each of the primary labels may include information on its corresponding each of the primary bounding boxes and its corresponding each piece of the primary class information.

Thereafter, the auto labeling device 100 may perform or support another device to perform a process of allowing at least one labeler to verify, e.g., manually, labeled primary objects on each of the labeled test images, to thereby generate correction-related class information which includes information on whether the primary labels of the labeled primary objects require to be corrected or not. In detail, the correction-related class information may include information on a first verification class representing a class of a first primary label, among the primary labels of the labeled primary objects, required to be corrected or having been corrected and a second verification class representing a class of a second primary label, among the primary labels of the labeled primary objects, not required to be corrected or not having been corrected.

And the auto labeling device 100 may perform or support another device to perform (i) a process of setting the first threshold confidence score to be used for determining whether it becomes unnecessary for the labeler to verify the labeled primary objects by referring to the primary confidence scores and the correction-related class information, respectively corresponding to the labeled primary objects and (ii) a process of setting the second threshold confidence score as a preset maximal allowed error, where the preset maximal allowed error is less than the first threshold confidence score.

Figure 4:
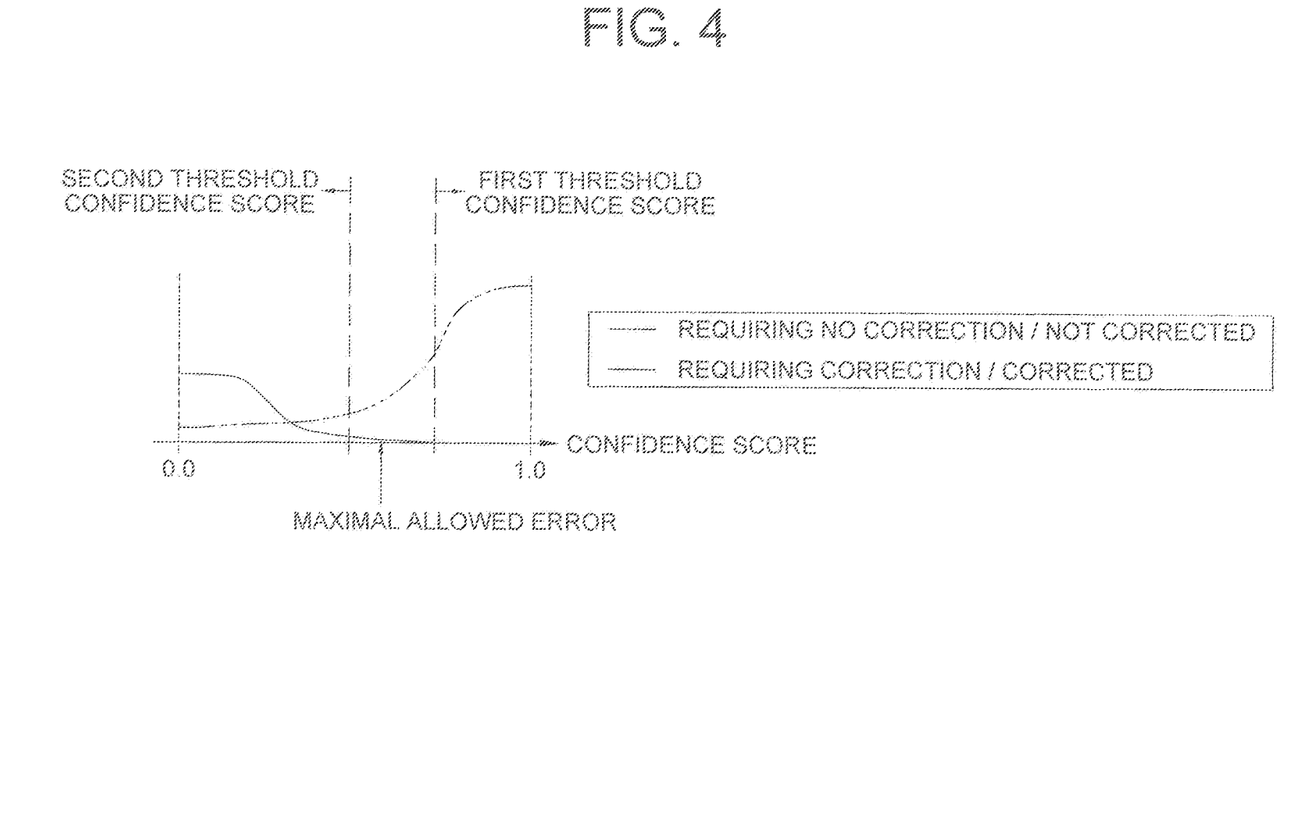
FIG. 4 is a block diagram schematically illustrating a process of setting a first threshold confidence score and a second threshold confidence score in accordance with one example of the present disclosure.

Herein, by referring to FIG. 4, the auto labeling device 100 may perform or support another device to perform a process of confirming (1) a first distribution over the primary confidence scores of the labeled primary objects corresponding to the first verification class and (2) a second distribution over the primary confidence scores of the labeled primary objects corresponding to the second verification class.

And, according to respective orders of a highest one to a lowest one of the primary confidence scores in the first distribution and those in the second distribution, the auto labeling device 100 may perform or support another device to perform (i) a process of calculating a first cumulative summation of the number of the labeled primary objects corresponding to the first verification class and a process of calculating a second cumulative summation of the number of the labeled primary objects corresponding to the second verification class, and (ii) a process of setting the first threshold confidence score to be a minimum among the primary confidence scores such that a ratio of (1) the second cumulative summation to (2) a sum of the first cumulative summation and the second cumulative summation satisfies a preset first criterion value.

Herein, since there is a possibility of presence of the primary objects which have high primary confidence scores although the primary objects have been corrected by the labeler, the auto labeling device 100 may perform or support another device to perform a process of setting the first threshold confidence score to be the minimum among the primary confidence scores such that the ratio of the number of the labeled primary objects corresponding to the second verification class to the sum of the first and the second cumulative summation also satisfies the first criterion value. For example, the first criterion value may be set as a value equal to or greater than 80%, and preferably, may be set as a value practically equal to 100%.

Also, according to an order of the highest one to the lowest one of the primary confidence scores in the first distribution, the auto labeling device 100 may perform or support another device to perform (i) a process of calculating the first cumulative summation of the number of the labeled primary objects corresponding to the first verification class, and (ii) a process of setting the second threshold confidence score such that a ratio of (1) the first cumulative summation to (2) the sum of the first cumulative summation and the second cumulative summation corresponds to the maximal allowed error.

For example, supposing that the number of the primary objects is 10,000, and 2,000 thereof correspond to the first verification class and 8,000 thereof correspond to the second verification class, and that the maximal allowed error is 1%, then the second threshold confidence score may be set as equal to a specific confidence score at a point where the first cumulative summation of the number of the primary objects corresponding to the first verification class is 1.000. Herein, potential errors may occur representing that the primary objects which needs to be verified by the labeler are not verified, and the maximal allowed error, representing a maximum ratio of the potential errors, may be set as a value equal to or less than 10% such that an appropriate trade-off between a quality and a quantity of the auto labeling occurs.

Next, on condition that the first threshold confidence score and the second threshold confidence score have been set according to the method as above, if the unlabeled images to be used for generating the training data are acquired, the auto labeling device 100 may perform or support another device to perform (i) a process of labeling each of the unlabeled images and thus generating the labeled images, and (ii) a process of generating each of secondary bounding boxes, each piece of secondary class information, and each of secondary confidence scores corresponding to each of one or more labeled secondary objects where the labeled secondary objects are present in each of the labeled images, at a step of S20.

That is, if the unlabeled images are acquired, the auto labeling device 100 may perform or support another device to perform a process of allowing the labeling network 150 to label each of the unlabeled images and thus to generate each of the labeled images. As a result, the labeling network 150 may perform a process of generating each of the secondary bounding boxes, each piece of the secondary class information, and each of the secondary confidence scores, corresponding to each of the secondary objects, where the secondary objects are present in each of the labeled test images. Herein, each of the secondary confidence scores may be a value ranging from 0 to 1 representing a probability that each of the secondary objects is present in its corresponding each of the secondary bounding boxes.

Next, the auto labeling device 100 may perform or support another device to perform (i) a process of generating each of object difficulty scores on each of the labeled secondary objects by using (1) each of the secondary confidence scores and (2) the first threshold confidence score, and (ii) a process of determining each of object difficulty classes on each of the labeled secondary objects by using (1) each of the secondary confidence scores and (2) the second threshold confidence score, at a step of S30.

That is, the auto labeling device 100 may allow the object difficulty estimation module 160 to generate each of the object difficulty scores on each of the labeled secondary objects by using (1) each of the secondary confidence scores corresponding to each of the labeled secondary objects and (2) the first threshold confidence score.

Herein, each of the object difficulty scores may be a value ranging from 0 to 1 representing a probability of necessity for verifying each of the labeled secondary objects, and the object difficulty estimation module 160 may (i) compare (1) each of the secondary confidence scores on each of the labeled secondary objects and (2) the first threshold confidence score, and (ii) generate (1) the object difficulty scores of the labeled secondary objects, whose secondary confidence scores are equal to or greater than the first threshold confidence score, as 0 and (2) the object difficulty scores of the labeled secondary objects, whose secondary confidence scores are less than the first threshold confidence score, respectively as 1 minus their corresponding secondary confidence scores.

Also, the auto labeling device 100 may allow the object difficulty estimation module 160 to determine each of the object difficulty classes on each of the labeled secondary objects by using (1) each of the secondary confidence scores corresponding to each of the labeled secondary objects and (2) the second threshold confidence score.

Herein, the object difficulty classes may include a hard object class representing a class of a first labeled secondary object, among the labeled secondary objects, required to be verified by the labeler and an easy object class representing a class of a second labeled secondary object, among the labeled secondary objects, not required to be verified by the labeler. And the object difficulty estimation module 160 may (i) compare (1) each of the secondary confidence scores on each of the labeled secondary objects and (2) the second threshold confidence score, and (ii) determine (ii-1) the object difficulty classes of the labeled secondary objects, whose secondary confidence scores are equal to or greater than the second threshold confidence score, as the easy object class and (ii-2) the object difficulty classes of the labeled secondary objects, whose secondary confidence scores are less than the second threshold confidence score, as the hard object class.

Herein, the lower the secondary confidence scores of the labeled secondary objects are, the more the cases of the labeled secondary objects required to be verified, i.e., manually corrected, by the labeler, are.

Therefore, the object difficulty estimation module 160 in accordance with the present disclosure may classify the labeled secondary objects into the easy object class representing the class of the second labeled secondary object not required to be verified by the labeler and the hard object class representing the class of the first labeled secondary object required to be verified by the labeler, based on the secondary confidence scores of the labeled secondary objects.

Meanwhile, if the labeled secondary objects corresponding to the easy object class are not verified, potential errors may occur representing that the manual correction by the labeler is required but the manual correction is not performed. Thus, based on the second threshold confidence score corresponding to the maximal allowed error which represents a maximum ratio of the potential errors and which is set for the appropriate trade-off between the quality and the quantity of the auto labeling, the labeled secondary objects may be classified into the easy object class and the hard object class.

Also, in case of a specific labeled secondary object whose confidence score is equal to or greater than the first threshold confidence score and thus having little risk of having the potential errors, its object difficulty score may be set as 0 to prevent the specific labeled secondary object from being used in calculating the image difficulty scores later.

Next, the auto labeling device 100 may perform or support another device to perform a process of determining each of the image difficulty classes on each of the labeled images by referring to each of the object difficulty scores on each of the labeled secondary objects, at a step of S40.

That is, the auto labeling device 100 may allow the image difficulty estimation module 170 to generate each of the image difficulty scores on each of the labeled images by referring to each of the object difficulty scores on each of the labeled secondary objects.

Herein, each of the image difficulty scores may be a value ranging from 0 to 1 representing a probability of necessity for verifying each of the labeled images, and the image difficulty estimation module 170 may (i) cumulatively sum the object difficulty scores of the labeled secondary objects corresponding to each of the labeled images and (ii) generate each of the image difficulty scores on each of the labeled images.

And, the auto labeling device 100 may allow the image difficulty estimation module 170 to determine each of the image difficulty classes on each of the labeled images by referring to the image difficulty scores.

Herein, the image difficulty classes may include a hard image class representing a class of a first labeled image, among the labeled images, required to be verified by the labeler and an easy image class representing a class of a second labeled image, among the labeled images, not required to be verified by the labeler. And the image difficulty estimation module 170 may (i) compare (1) each of the image difficulty scores on each of the labeled images and (2) 1 minus the second threshold confidence score, and (ii) determine (1) the image difficulty classes of the labeled images, whose image confidence scores are equal to or greater than said 1 minus the second threshold confidence score, as the hard image class, and (2) the image difficulty classes of the labeled images, whose image confidence scores are less than said 1 minus the second threshold confidence score, as the easy image class.

That is, even if all the labeled secondary objects corresponding to the easy object class are verified and corrected, actual and substantial improvement in the quality of the auto labeling occurs only within the maximal allowed error.

Therefore, the image difficulty estimation module 170 in accordance with the present disclosure may classify as many labeled images as possible into the easy image class while guaranteeing the quality without exceeding the maximal allowed error, thus maximizing productivity.

Also, the image difficulty score of a single labeled image may be defined simply as a sum of the object difficulty scores of the labeled objects therein, and the single labeled image may be classified into the easy image class or the hard image class based on the second threshold confidence score.

And in case of a specific labeled secondary object, statistically guaranteed as corresponding to the second verification class, whose confidence score is equal to or greater than the first threshold confidence score, its object difficulty score is set as 0 to prevent the specific labeled secondary object from being used in calculating the image difficulty scores.

The case of the first labeled image, among the labeled images, classified into the hard image class may be described as two cases below.

A first case is a case in which the single labeled image includes one or more of the labeled secondary objects having the hard object class.

This is because the labeled secondary objects are required to be verified in order to guarantee the quality of the auto labeling.

A second case is a case in which the single labeled image includes a plenty of the labeled secondary objects, determined as the easy object class, whose object difficulty scores are larger than 0.

That is, by referring to FIG. 4, a range between the first threshold confidence score and the second threshold confidence score may be a range where the confidence scores of the labeled secondary objects, having the easy object class and their corresponding object difficulty scores larger than 0, are positioned.

For example, supposing a result that 2,000 of the labeled secondary objects have been corrected, 8,000 of the labeled secondary objects have not been corrected, the maximal allowed error is 1%, and that the number of the labeled secondary objects whose confidence scores are equal to or greater than the first threshold confidence score is 4,000, then within the range between the first threshold confidence score and the second threshold confidence score, the number of the labeled secondary objects, i.e., the number of the potential errors, may be 100 and the number of the labeled secondary objects which have not been corrected may be 4,000 and thus the ratio of the number of the labeled secondary objects which have not been corrected may be 97.5%.

Therefore, if a single labeled image includes a single easy object class, then a probability of necessity for correcting the labeling is a mere 2.5%, but if the single labeled image includes ten easy object classes, a probability of possible potential errors may be $1-(0.975)^{10}$, i.e., 22.4%.

That is, the present disclosure allows verifying the labeled images only in the case where the easy object classes are plenty, thus minimizing extra workload and improving the quality of the labeling efficiently.

Next, the auto labeling device 100 may perform or support another device to perform a process of allowing the labeler to verify the first labeled images which are labeled as the hard image class and thus to generate the verified labeled images, at a step of S50.

That is, the auto labeling device 100 may perform or support another device to perform a process of transmitting, to the labeler, the first labeled images which are labeled as the hard image class by referring to each of the image difficulty classes on each of the labeled images, to thereby allow the labeler to verify the first labeled images and thus to generate the verified labeled images.

Figure 5:
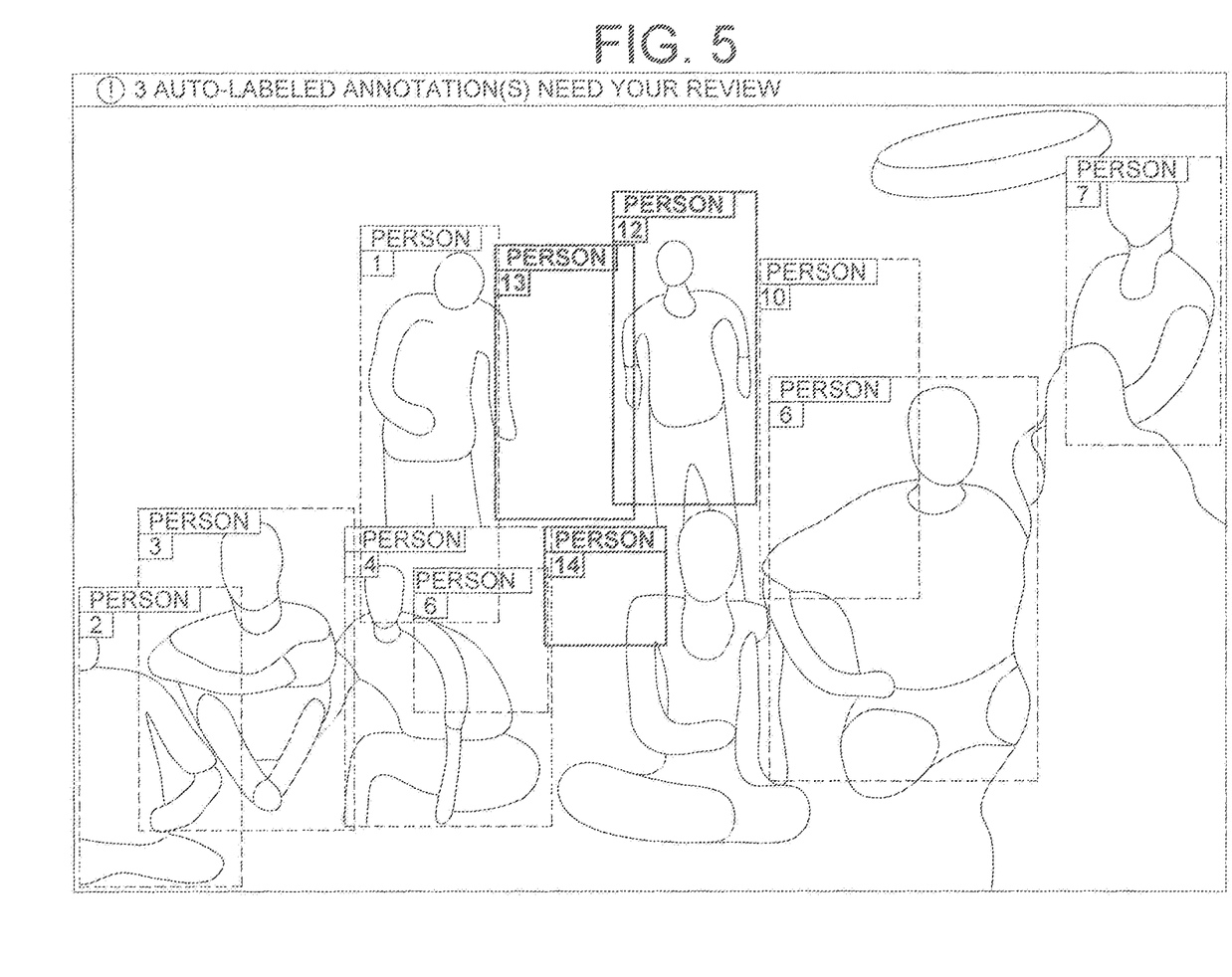
FIG. 5 is an actual captured image of the labeled image required to be verified by the labeler in accordance with one example of the present disclosure.

Herein, by referring to FIG. 5, when requesting for the first labeled images to be verified, the auto labeling device 100 may indicate the labeled secondary objects, required to be verified (see boxes with solid lines), on the first labeled images, to thereby allow the labeler to easily recognize areas required to be verified.

Next, the auto labeling device 100 may perform or support another device to perform a process of generating the training data comprised of second labeled images, which are labeled as the easy image class, among the labeled images, and the verified labeled images, at a step of S60.

That is, the auto labeling device 100 may perform or support another device to perform generating the training data, to be used for training the deep learning network, comprised of (1) the second labeled images which are labeled by the image difficulty estimation module 170 as the easy image class among the labeled images, and (2) the verified labeled images which are verified by the labeler.

In addition, the auto labeling device 100 may improve the quality of the auto labeling by training the labeling network 150 with the verified labeled images.

Herein, the auto labeling device 100 may perform or support another device to perform a process of updating one or more parameters of the labeling network 150 via backpropagation using one or more losses calculated by referring to the first labeled images which are determined as the hard image class and their corresponding verified labeled images.

The present disclosure has an effect of reducing time of inspection by selectively inspecting only images that are difficult to label among images automatically labeled by the auto labeling device.

The present disclosure has another effect of increasing a throughput of the labeling for entire images by allowing an unskilled inspector to keep up with a throughput of the auto labeling device via selectively inspecting only the images that are difficult to label among the images automatically labeled by the auto labeling device.

The present disclosure has still another effect of reducing a cost by decreasing the number of inspectors via selectively inspecting only the images that are difficult to label among the images automatically labeled by the auto labeling device.

The present disclosure has still yet another effect of improving a throughput of the auto labeling, without degrading an accuracy of the auto labeling by selectively inspecting only the images that are difficult to label among the images automatically labeled by the auto labeling device.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for generating training data to be used for training a deep learning network capable of analyzing images, comprising steps of:

(a) if one or more test images are acquired, an auto labeling device performing or supporting another device to perform (i) a process of allowing the labeling network to (i-1) label each of the test images and thus to generate each of labeled test images, and (i-2) generate each of primary bounding boxes, each piece of primary class information, and each of primary confidence scores, corresponding to each of one or more primary objects, wherein the primary objects are present in each of the labeled test images and wherein each of the primary confidence scores is a value ranging from 0 to 1 representing a probability that each of the primary objects is present in its corresponding each of the primary bounding boxes, (ii) a process of allowing at least one labeler to verify labeled primary objects on each of the labeled test images, to thereby generate correction-related class information, wherein the correction-related class information includes information on a first verification class representing a class of a first primary label, among primary labels of the labeled primary objects, required to be corrected or having been corrected and a second verification class representing a class of a second primary label, among the primary labels of the labeled primary objects, not required to be corrected or not having been corrected and wherein each of the primary labels includes information on its corresponding each of the primary bounding boxes and its corresponding each piece of the primary class information and, (iii) a process of setting a first threshold confidence score to be used for determining whether it becomes unnecessary for the labeler to verify the labeled primary objects by referring to the primary confidence scores and the correction-related class information, respectively corresponding to the labeled primary objects and (iv) a process of setting a second threshold confidence score as a preset maximal allowed error, wherein the preset maximal allowed error is less than the first threshold confidence score;

(b) if one or more unlabeled images are acquired, the auto labeling device performing or supporting another device to perform (i) a process of allowing the labeling network to (i-1) label each of the unlabeled images and thus to generate labeled images, and (i-2) generate each of secondary bounding boxes, each piece of secondary class information, and each of secondary confidence scores, corresponding to each of one or more secondary objects, wherein the secondary objects are present in each of the labeled images, and wherein each of the secondary confidence scores is a value ranging from 0 to 1 representing a probability that each of the secondary objects is present in its corresponding each of the secondary bounding boxes, (ii) a process of allowing an object difficulty estimation module to (ii-1) generate each of object difficulty scores on each of labeled secondary objects by using (1) each of the secondary confidence scores corresponding to each of the labeled secondary objects and (2) the first threshold confidence score, wherein each of the object difficulty scores is a value ranging from 0 to 1 representing a probability of necessity for verifying each of the labeled secondary objects, and (ii-2) determine each of object difficulty classes on each of the labeled secondary objects by using (1) each of the secondary confidence scores corresponding to each of the labeled secondary objects and (2) the second threshold confidence score, wherein the object difficulty classes include a hard object class representing a class of a first labeled secondary object, among the labeled secondary objects, required to be verified by the labeler and an easy object class representing a class of a second labeled secondary object, among the labeled secondary objects, not required to be verified by the labeler, (iii) a process of allowing an image difficulty estimation module to (iii-1) generate each of image difficulty scores on each of the labeled images by referring to each of the object difficulty scores on each of the labeled secondary objects, wherein each of the image difficulty scores is a value ranging from 0 to 1 representing a probability of necessity for verifying each of the labeled images, and (iii-2) determine each of image difficulty classes on each of the labeled images by referring to the image difficulty scores, wherein the image difficulty classes include a hard image class representing a class of a first labeled image, among the labeled images, required to be verified by the labeler and an easy image class representing a class of a second labeled image, among the labeled images, not required to be verified by the labeler; and (c) the auto labeling device performing or supporting another device to perform (i) a process of transmitting, to the labeler, first labeled images which are labeled as the hard image class by referring to each of the image difficulty classes on each of the labeled images, to thereby allow the labeler to verify the first labeled images and thus to generate verified labeled images, and (ii) a process of generating the training data comprised of (1) second labeled images which are labeled as the easy image class among the labeled images, and (2) the verified labeled images.

2. The method of claim 1, wherein, at the step of (a), the auto labeling device performs or supports another device to perform (i) a process of confirming a first distribution over the primary confidence scores of the labeled primary objects corresponding to the first verification class and a second distribution over the primary confidence scores of the labeled primary objects corresponding to the second verification class, (ii) according to respective orders of a highest one to a lowest one of the primary confidence scores in the first distribution and those in the second distribution, (ii-1) a process of calculating a first cumulative summation of the number of the labeled primary objects corresponding to the first verification class and a process of calculating a second cumulative summation of the number of the labeled primary objects corresponding to the second verification class, and (ii-2) a process of setting the first threshold confidence score to be a minimum among the primary confidence scores such that a ratio of (1) the second cumulative summation to (2) a sum of the first cumulative summation and the second cumulative summation satisfies a preset first criterion value, and (iii) according to an order of the highest one to the lowest one of the primary confidence scores in the first distribution, (iii-1) a process of calculating the first cumulative summation of the number of the labeled primary objects corresponding to the first verification class, and (iii-2) a process of setting the second threshold confidence score such that a ratio of (1) the first cumulative summation to (2) the sum of the first cumulative summation and the second cumulative summation corresponds to the maximal allowed error.

3. The method of claim 1, wherein, at the step of (b), the auto labeling device performs or supports another device to perform a process of allowing the object difficulty estimation module to (i) (i-1) compare (1) each of the secondary confidence scores on each of the labeled secondary objects and (2) the first threshold confidence score, and (i-2) generate (1) the object difficulty scores of the labeled secondary objects, whose secondary confidence scores are equal to or greater than the first threshold confidence score, as 0 and (2) the object difficulty scores of the labeled secondary objects, whose secondary confidence scores are less than the first threshold confidence score, respectively as 1 minus their corresponding secondary confidence scores, and (ii)(ii-1) compare (1) each of the secondary confidence scores on each of the labeled secondary objects and (2) the second threshold confidence score, and (ii-2) determine (1) the object difficulty classes of the labeled secondary objects, whose secondary confidence scores are equal to or greater than the second threshold confidence score, as the easy object class and (2) the object difficulty classes of the labeled secondary objects, whose secondary confidence scores are less than the second threshold confidence score, as the hard object class.

4. The method of claim 1, wherein, at the step of (b), the auto labeling device performs or supports another device to perform a process of allowing the image difficulty estimation module to (i) cumulatively sum the object difficulty scores of the labeled secondary objects corresponding to each of the labeled images and (ii) generate each of the image difficulty scores on each of the labeled images.

5. The method of claim 4, wherein the auto labeling device performs or supports another device to perform a process of allowing the image difficulty estimation module to (i) compare (1) each of the image difficulty scores on each of the labeled images and (2) 1 minus the second threshold confidence score, and (ii) determine (1) the image difficulty classes of the labeled images, whose image confidence scores are equal to or greater than said 1 minus the second threshold confidence score, as the hard image class, and (2) the image difficulty classes of the labeled images, whose image confidence scores are less than said 1 minus the second threshold confidence score, as the easy image class.

6. The method of claim 1, further comprising a step of:
(d) the auto labeling device performing or supporting another device to perform a process of training the labeling network by using the verified labeled images.

7. The method of claim 6, wherein the auto labeling device performs or supports another device to perform a process of updating one or more parameters of the labeling network via backpropagation using one or more losses calculated by referring to the first labeled images and the verified labeled images.

8. An auto labeling device for generating training data to be used for training a deep learning network capable of analyzing images, comprising:
at least one memory that stores instructions; and
at least one processor configured to execute the instructions to perform or support another device to perform: (1) if one or more test images are acquired, (i) a process of allowing the labeling network to (i-1) label each of the test images and thus to generate each of labeled test images, and (i-2) generate each of primary bounding boxes, each piece of primary class information, and each of primary confidence scores, corresponding to each of one or more primary objects, wherein the primary objects are present in each of the labeled test images and wherein each of the primary confidence scores is a value ranging from 0 to 1 representing a probability that each of the primary objects is present in its corresponding each of the primary bounding boxes, (ii) a process of allowing at least one labeler to verify labeled primary objects on each of the labeled test images, to thereby generate correction-related class information, wherein the correction-related class information includes information on a first verification class representing a class of a first primary label, among primary labels of the labeled primary objects, required to be corrected or having been corrected and a second verification class representing a class of a second primary label, among the primary labels of the labeled primary objects, not required to be corrected or not having been corrected and wherein each of the primary labels includes information on its corresponding each of the primary bounding boxes and its corresponding each piece of the primary class information and, (iii) a process of setting a first threshold confidence score to be used for determining whether it becomes unnecessary for the labeler to verify the labeled primary objects by referring to the primary confidence scores and the correction-related class information, respectively corresponding to the labeled primary objects and (iv) a process of setting a second threshold confidence score as a preset maximal allowed error, wherein the preset maximal allowed error is less than the first threshold confidence score, (II) if one or more unlabeled images are acquired, (i) a process of allowing the labeling network to (i-1) label each of the unlabeled images and thus to generate labeled images, and (i-2) generate each of secondary bounding boxes, each piece of secondary class information, and each of secondary confidence scores, corresponding to each of one or more secondary objects, wherein the secondary objects are present in each of the labeled images, and wherein each of the secondary confidence scores is a value ranging from 0 to 1 representing a probability that each of the secondary objects is present in its corresponding each of the secondary bounding boxes, (ii) a process of allowing an object difficulty estimation module to (ii-1) generate each of object difficulty scores on each of labeled secondary objects by using (1) each of the secondary confidence scores corresponding to each of the labeled secondary objects and (2) the first threshold confidence score, wherein each of the object difficulty scores is a value ranging from 0 to 1 representing a probability of necessity for verifying each of the labeled secondary objects, and (ii-2) determine each of object difficulty classes on each of the labeled secondary objects by using (1) each of the secondary confidence scores corresponding to each of the labeled secondary objects and (2) the second threshold confidence score, wherein the object difficulty classes include a hard object class representing a class of a first labeled secondary object, among the labeled secondary objects, required to be verified by the labeler and an easy object class representing a class of a second labeled secondary object, among the labeled secondary objects, not required to be verified by the labeler, (iii) a process of allowing an image difficulty estimation module to (iii-1) generate each of image difficulty scores on each of the labeled images by referring to each of the object difficulty scores on each of the labeled secondary objects, wherein each of the image difficulty scores is a value ranging from 0 to 1 representing a probability of necessity for verifying each of the labeled images, and (iii-2) determine each of image difficulty classes on each of the labeled images by referring to the image difficulty scores, wherein the image difficulty classes include a hard image class representing a class of a first labeled image, among the labeled images, required to be verified by the labeler and an easy image class representing a class of a second labeled image, among the labeled images, not required to be verified by the labeler, and (III) (i) a process of transmitting, to the labeler, first labeled images which are labeled as the hard image class by referring to each of the image difficulty classes on each of the labeled images, to thereby allow the labeler to verify the first labeled images and thus to generate verified labeled images, and (ii) a process of generating the training data comprised of (1) second labeled images which are labeled as the easy image class among the labeled images, and (2) the verified labeled images.

9. The auto labeling device of claim 8, wherein, at the process of (I), the processor performs or supports another device to perform (i) a process of confirming a first distribution over the primary confidence scores of the labeled primary objects corresponding to the first verification class and a second distribution over the primary confidence scores of the labeled primary objects corresponding to the second verification class, (ii) according to respective orders of a highest one to a lowest one of the primary confidence scores in the first distribution and those in the second distribution, (ii-1) a process of calculating a first cumulative summation of the number of the labeled primary objects corresponding to the first verification class and a process of calculating a second cumulative summation of the number of the labeled primary objects corresponding to the second verification class, and (ii-2) a process of setting the first threshold confidence score to be a minimum among the primary confidence scores such that a ratio of (1) the second cumulative summation to (2) a sum of the first cumulative summation and the second cumulative summation satisfies a preset first criterion value, and (iii) according to an order of the highest one to the lowest one of the primary confidence scores in the first distribution, (iii-1) a process of calculating the first cumulative summation of the number of the labeled primary objects corresponding to the first verification class, and (iii-2) a process of setting the second threshold confidence score such that a ratio of (1) the first cumulative summation to (2) the sum of the first cumulative summation and the second cumulative summation corresponds to the maximal allowed error.

10. The auto labeling device of claim 8, wherein, at the process of (II), the processor performs or supports another device to perform a process of allowing the object difficulty estimation module to (i) (i-1) compare (1) each of the secondary confidence scores on each of the labeled secondary objects and (2) the first threshold confidence score, and (i-2) generate (1) the object difficulty scores of the labeled secondary objects, whose secondary confidence scores are equal to or greater than the first threshold confidence score, as 0 and (2) the object difficulty scores of the labeled secondary objects, whose secondary confidence scores are less than the first threshold confidence score, respectively as 1 minus their corresponding secondary confidence scores, and (ii) (ii-1) compare (1) each of the secondary confidence scores on each of the labeled secondary objects and (2) the second threshold confidence score, and (ii-2) determine (1) the object difficulty classes of the labeled secondary objects, whose secondary confidence scores are equal to or greater than the second threshold confidence score, as the easy object class and (2) the object difficulty classes of the labeled secondary objects, whose secondary confidence scores are less than the second threshold confidence score, as the hard object class.

11. The auto labeling device of claim 8, wherein, at the process of (II), the processor performs or supports another device to perform a process of allowing the image difficulty estimation module to (i) cumulatively sum the object difficulty scores of the labeled secondary objects corresponding to each of the labeled images and (ii) generate each of the image difficulty scores on each of the labeled images.

12. The auto labeling device of claim 11, wherein the processor performs or supports another device to perform a process of allowing the image difficulty estimation module to (i) compare (1) each of the image difficulty scores on each of the labeled images and (2) 1 minus the second threshold confidence score, and (ii) determine (1) the image difficulty classes of the labeled images, whose image confidence scores are equal to or greater than said 1 minus the second threshold confidence score, as the hard image class, and (2) the image difficulty classes of the labeled images, whose image confidence scores are less than said 1 minus the second threshold confidence score, as the easy image class.

13. The auto labeling device of claim 8, wherein the processor further performs or supports another device to perform:
 (IV) a process of training the labeling network by using the verified labeled images.

14. The auto labeling device of claim 13, wherein the processor performs or supports another device to perform a process of updating one or more parameters of the labeling network via backpropagation using one or more losses calculated by referring to the first labeled images and the verified labeled images.

* * * * *